United States Patent
Snay et al.

(12)
(10) Patent No.: US 6,282,678 B1
(45) Date of Patent: *Aug. 28, 2001

(54) GENERIC TEST EXECUTION METHOD AND APPARATUS

(75) Inventors: David K. Snay, West Boylston; Faiz Syed, Westford, both of MA (US)

(73) Assignee: Cisco Technology, Inc., San Jose, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/226,984

(22) Filed: Jan. 8, 1999

(51) Int. Cl.[7] .................................................. G01R 31/28
(52) U.S. Cl. ............................................. 714/712; 714/31
(58) Field of Search ............................ 370/244; 714/25, 714/38, 43, 36, 736, 712, 31; 395/183.08

(56) References Cited

U.S. PATENT DOCUMENTS

| 5,271,000 | * | 12/1993 | Engbersen et al. | 370/244 |
| 5,421,004 | * | 5/1995 | Carpenter et al. | 714/25 |
| 5,557,740 | * | 9/1996 | Johnson et al. | 714/38 |
| 5,854,889 | * | 12/1998 | Liese et al. | 714/43 |
| 5,864,660 | * | 1/1999 | Hamameh et al. | 395/183.08 |
| 5,987,625 | * | 11/1999 | Wolff | 714/36 |
| 6,134,690 | * | 10/2000 | Ivaturi et al. | 714/736 |

* cited by examiner

Primary Examiner—Albert Decady
Assistant Examiner—David Ton
(74) Attorney, Agent, or Firm—Hamilton, Brook, Smith & Reynolds, P.C.

(57) ABSTRACT

A test system for network communication devices comprising a topology input file describing connections between the network communication devices, a test environment support routines library containing device-independent test information for data management, a case specific routines library containing device-specific tests and device-specific configuration control information for the network communication devices, and a main driver routine, which references the topology input routines, the test environment support routines, and the case specific test routines. The test control computer is connected to the network communication devices to download configuration and control information. The main driver routine receives a test command, and, in response, accesses the corresponding topology input file to build test vector command buffers for each of the network communication devices to establish configuration for testing. The main driver routine uses test environment support routines to manage data on the computer and executes the specific test case routines according to the topology input file. In a preferred embodiment, the test control computer communicates with the network communication devices by using an automated test system.

20 Claims, 11 Drawing Sheets

GENERIC TEST EXECUTION METHOD AND APPARATUS

BACKGROUND OF THE INVENTION

In order to accommodate the increasing amount of data traveling over networks, communication speed improvements for network communication devices are constantly sought. Speed improvements mandate new transmission protocols. The new transmission protocols may be evolutionary or revolutionary. In both cases, however, comprehensive testing is mandatory.

An example of a data or network communication device that requires testing and is used to transmit data over networks, such as the internet, is a router. Routers select the best path to send a message, based on the destination and source addresses. Routers perform a number of tasks. High level routing tasks are partitioned into smaller subtasks, forming layering and service models. The idea behind layering is that each layer is responsible for providing some service to the layer above and does this by using the services of the layer below. There are certain interfaces required to communicate between layers, and there are protocols for communicating between the same level layers located on different routers. Router and other network device manufacturers must test communication links and protocols between each layer combination exhaustively as part of device and network validation.

Besides layer communication protocols, there are intra- and inter-domain routing protocols. Examples of intra-domain routing protocols are RIP, IS-IS, OSPF, and integrated routing. Some examples of inter-domain routing protocols are static routing, EGP, BGP, IDRP. These protocols are also continually evolving, and the network communications devices implementing the protocols must be tested before new features are released to market.

Like routing protocols, switching modes in routers are also evolving. Some examples of switching modes are CEF (Cisco Express Forwarding, which is a non-cache-based switching mode for IP packets), IP switching (which is cache-based), and Tag Switching (where "tags" are added to each IP packet). Improvements and extensions are being made continually to these and other switching modes. Consequently, extensive testing of new features is critical.

Hardware interfaces are also increasing in variation, sophistication, and bandwidth (among other features). Example interfaces include Ethernet, Fast Ethernet, Token Ring, FDDI (fiber distributed data interface), and HSSI (high speed serial interface). Some routers support multiple interfaces of the same type or different types. Like the routing protocols and the switching modes, hardware interfaces are also evolving. And, like routing protocols and switching modes, hardware interfaces also require comprehensive testing on a network topology level.

Still further, in order to communicate between a source and a destination, data packets may have to travel over networks using different routing protocols, different switching modes, and hardware interfaces as they travel from link to link on their data paths. To do this, the data packets are typically encapsulated, in Ethernet frames for example. These encapsulation modes are also modified periodically in order to keep up with the changing interfaces, switching modes, and routing protocols.

Developments in new routing protocols, switching modes, encapsulation modes, and hardware interfaces require new sets of tests; but, backward compatibility is usually a requirement in order to maintain an existing client base so that new computers and new data communication devices can be added to their existing networks with minimal cost and impact to an existing, running network. This means that each time a small improvement is made, new testing must be performed on the data communication devices, as well as testing to ensure backward compatibility.

In general, most testing code is the same for performing standard network testing tasks, such as establishing network communication and network configuration, and collecting data, while specific functionality tests are often unique, being written to test a single functionality of a specific network communication device in a specific test environment.

SUMMARY OF THE INVENTION

The problem with the typical strategy to implement device testing is that every test engineer must design a test program for every protocol, switching mode, hardware interface, and encapsulation mode. Although commonality exists among the code used to perform this testing, typically the test scripts are written in a non-general format with no way of taking advantage of the common and reusable code sections in future test programs.

The current invention provides increased expandability, versatility and reusability of test code by identifying and grouping similar code into test environment support libraries, specific test libraries, and topology files. A general main driver routine solves the expandability, versatility, and reusability issues since the corresponding components are kept external or distinct from the static, single purpose, generic main driver routine. And, once code is developed for new routing protocols, switching modes, encapsulation modes, and hardware interfaces, the code is accessible and can be exercised by other external routines, thereby reducing test development, debug, and integration times.

In general, according to one aspect, the invention features a test system for network communication devices comprising a topology input file. This file describes connections between the network communication devices. A test environment support routines library contains device-independent test information for data management. A case specific routines library contains device-specific tests and device-specific configuration control information for the network communication devices. And, a main driver routine then references the topology input routines, the test environment support routines, and the case specific test routines.

A test control computer is connected to the network communication devices to receive configuration and control information. The main driver routine, usually running on the control computer, receives a test command, and, in response, accesses the corresponding topology input file to build test vector command buffers for each of the network communication devices to establish configuration for testing. The main driver routine uses test environment support routines to manage data on the control computer and executes the specific test case routines according to the topology input file. In a preferred embodiment, the test control computer communicates with the network communication devices by using an automated test system.

The above and other features of the invention, including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the drawings, like reference characters refer to the same parts throughout the different views. The drawings are not necessarily to scale, emphasis instead being placed upon illustrating the principles of the invention.

DETAILED DESCRIPTION OF THE INVENTION

Figure 1A:
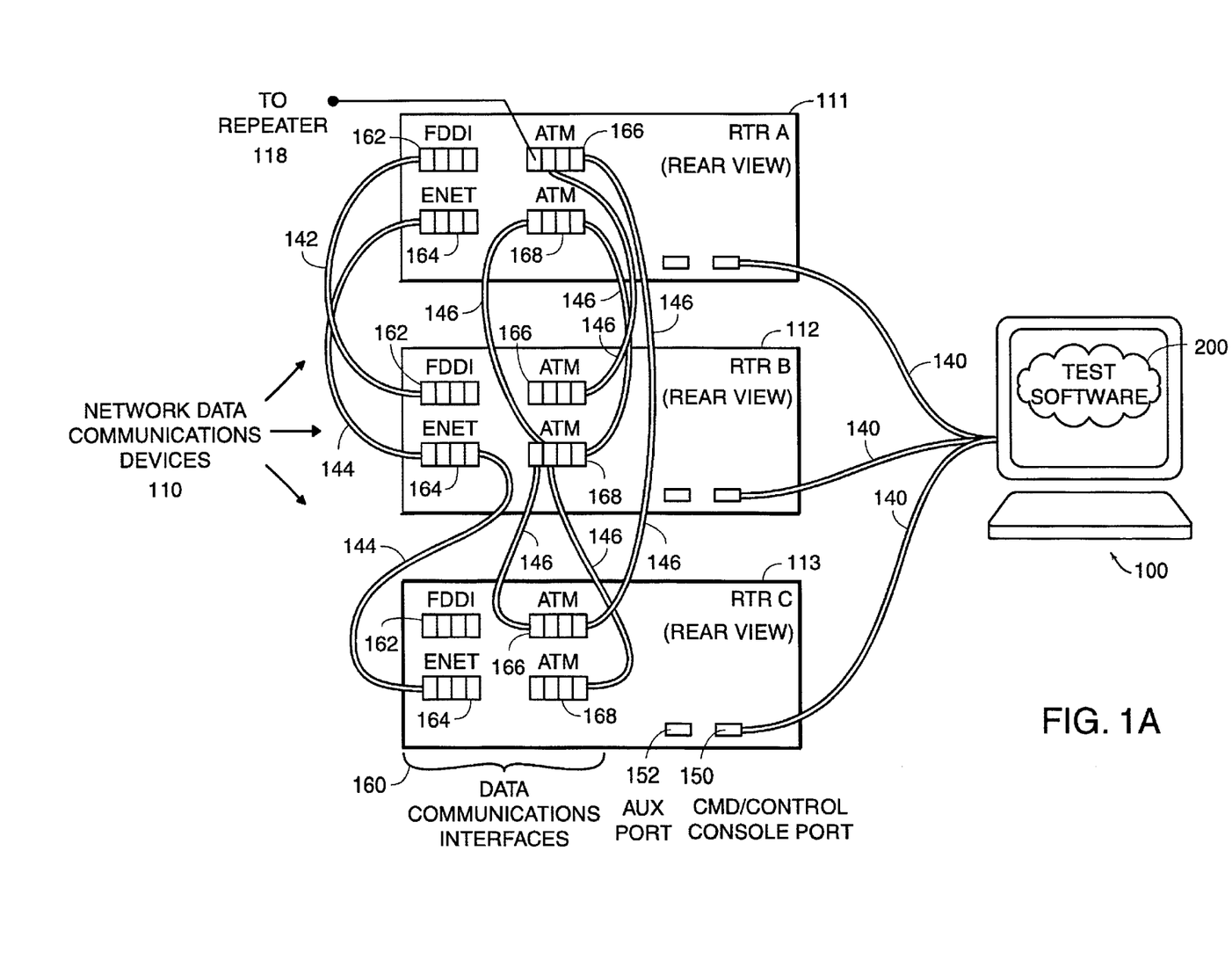
FIG. 1A is a schematic diagram illustrating an exemplary test computer connected to a physical network.

FIG. 1A shows an example of a physical portion of a network communication test environment. A test computer 100 interfaces with network data communication devices 110 through cabling 140, preferably, to the data communication devices command/control console ports 150. Depending on the application, the data communication devices to be tested are routers, repeaters, bridges, concentrators, and/or cable modems, for example. In the illustrated embodiment, three routers (RTR): router A 111, router B 112, router C 113 are connected to a test computer 100.

Data communication interfaces 160 are used to transfer data among the data communication devices 111, 112, 113. These data interfaces 160 are often referred to as local area network (LAN) interfaces. Typical LAN interfaces are Ethernet, FDDI, and HSSI. Interconnecting cabling 142, 144, 146 is typically shielded, unshielded, or fiberoptic, where each type has connectors appropriate for the cabling and the connectors located on the data communication devices hardware interfaces 162, 164, 166. Signal connections between router A 111, router B 112, and router C 113 with cables 142, 144, 146 is part of the physical layer testing, wherein interface connectors and cable continuity is tested during hookup and data transfer testing. The test software 200 residing on the computer 100 does not need to know the cable types used to interconnect the various interfaces on data communication devices 110, but it does need to know what the interfaces are to establish the respective protocols used for data transmission.

A test engineer creates a "fully connected" network, which means each pair of nodes (e.g., routers 111, 112, 113) in a network has a direct link. In the preferred embodiment, interfaces are turned on and off for "non-responsive" testing. The data communication interfaces 160 are also put into different hardware protocols for data transfer. The testing will account for and test various baud rates each hardware interface is capable of operating. The command/control console port 150 is used to transfer data back to the test computer 100 over test cables 140 to store test information captured by the data communication devices 110 during testing.

FIG. 1A also has a cable going to a repeater 118, referred to as a "hanger." There may be another network on the other side of the repeater 118 or there may be nothing. Furthermore, additional data communication devices are added as needed to the example network shown in FIG. 1A to add data traffic for network testing under loaded conditions. The present invention enables one to issue traffic generation commands to data communication devices in the network topology that are there for traffic generation purposes; then, those data communication devices are responsible for forming and transmitting the packet traffic, thereby freeing the test computer 100 to perform other tasks.

Figure 1B:
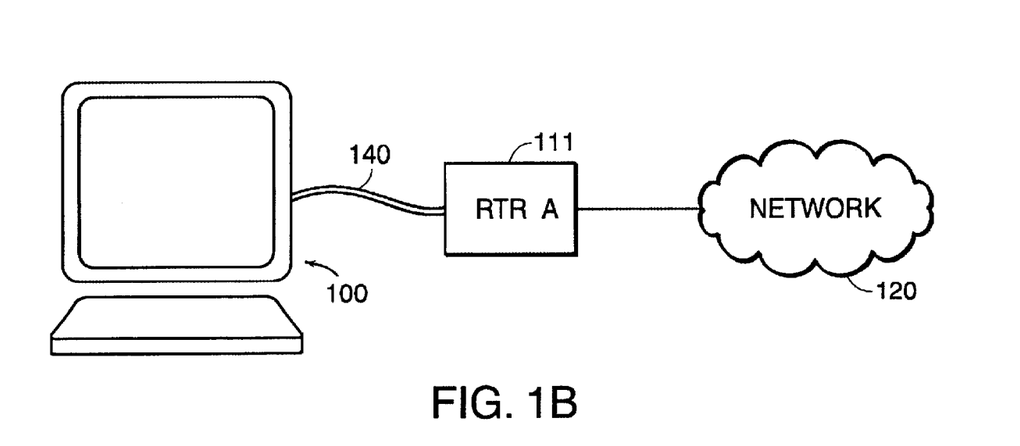
FIG. 1B is a schematic diagram showing a test computer connected to a router connected to a network cloud.

FIG. 1B shows another example of a test bed in which the test computer 100 is connected to single router A 111 interconnected electrically by cable 140. Router A 111 interfaces to a network cloud 120. The test software 200 is designed to perform various router protocol tests, switching mode tests, and encapsulation mode tests used in data transfer between router A 111 and the network cloud 120.

Figure 1C:
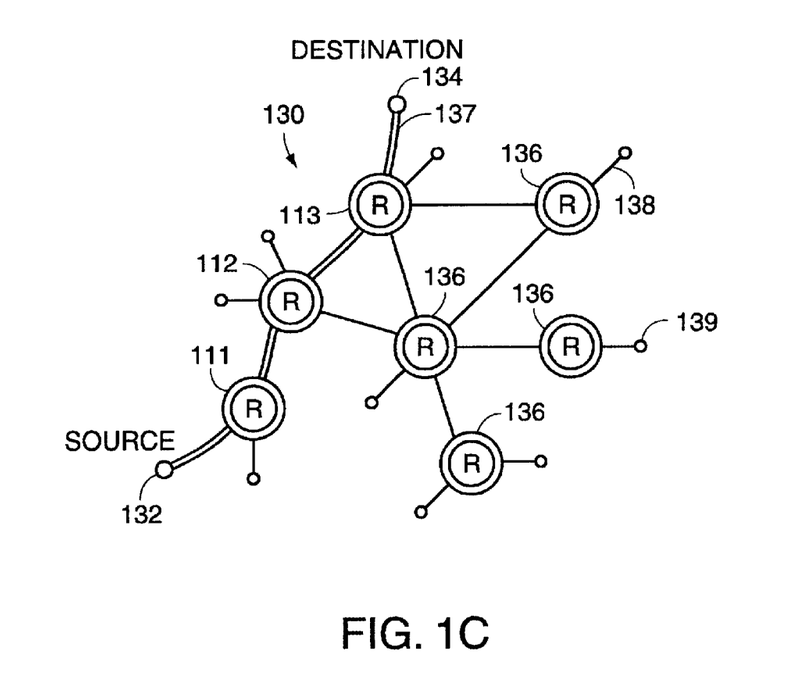
FIG. 1C is node connection diagram showing a source communicating with a destination via three routers located in a larger network.

FIG. 1C depicts still another test bed in which a larger network of routers 111, 112, 113, 136, links 137, 138, and end nodes 132, 134, 139. Here, the test computer is connected to one or multiple routers 111, 112, 113 in a larger network 130. A source 132 is communicating to a destination 134 via router A 111, router B 112, router C 113 traveling across the links 137. Routers 136, not in the path of the source 132 and the destination 134, as defined by path 137, are or can be used to create data traffic to further test the router protocols, switching modes, and encapsulation modes. Routers 136 not connected to the main links 137 are used to test alternate routes for transmitting data between the source 132 and the destination 134.

Figures 1D, 1E:
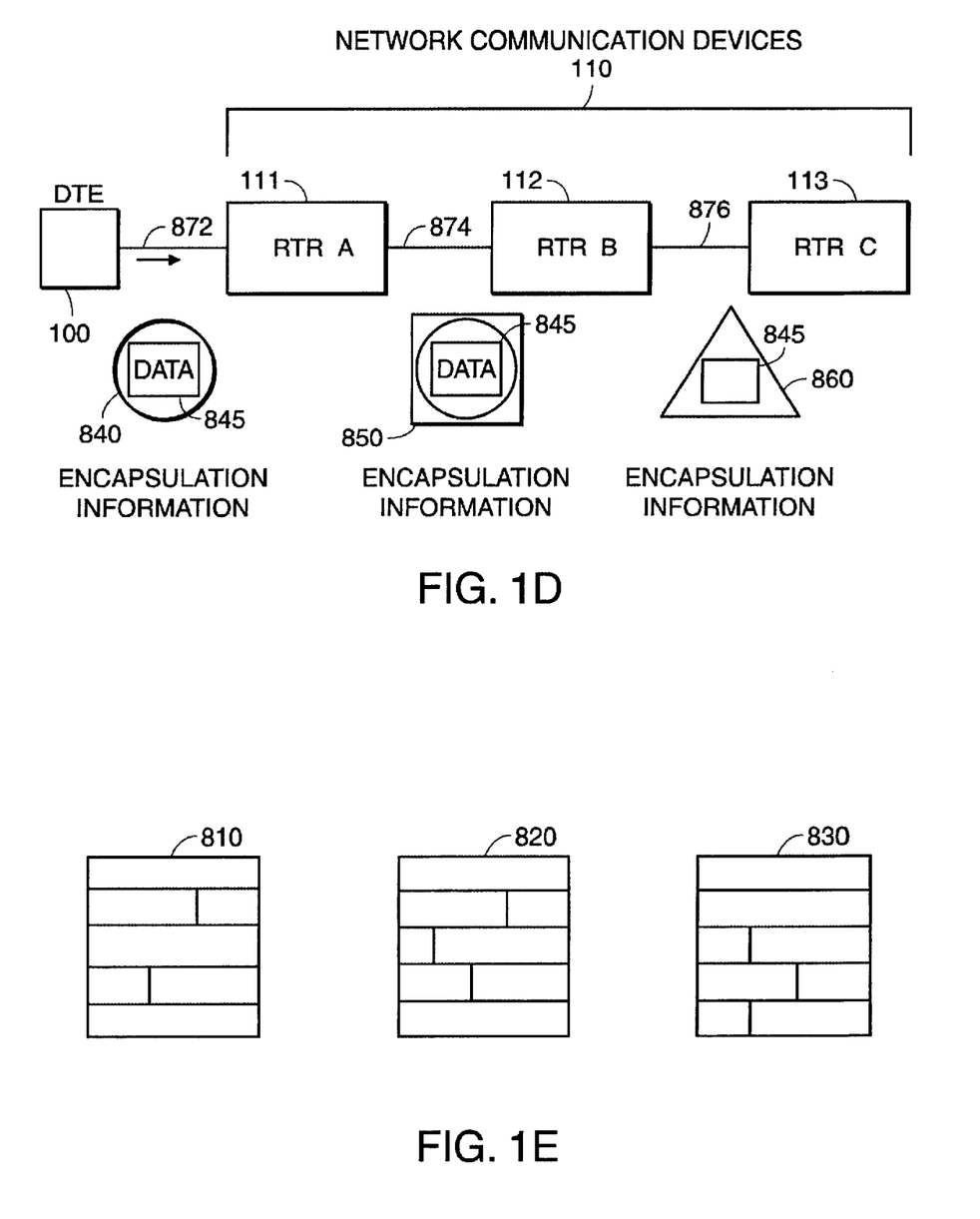
FIG. 1D is a schematic diagram illustrating data encapsulation for different protocol layers being transferred from router to router.
FIG 1E schematically shows data packets, where individual blocks contain control octets data in formats proscribed by various transmission protocols.

FIG. 1D shows a further test bed. The test computer 100 with test software 200 interfaces to a router A 111, which interfaces to router B 112, which interfaces to router C 113. This embodiment is useful for testing communication protocol levels higher than the hardware protocols. Data 845 surrounded by encapsulation shroud 840 is transmitted first from test computer 100 to router A 111. Data 845 is transmitted then from router A 111 to router B 112 in a new encapsulation shroud 850. Communication link 872 can be different from communication link 874 and communication link 876, giving rise to the different communication shrouds 840, 850, 860. The data 845 is further transmitted from router B 112 to router C 113. A different encapsulation shroud 860 surrounds the data 845 to enable proper data 845 transmission between router B and router C. In a preferred embodiment of this invention, test computer 100 will receive information from router A 111, router B 112, and router C 113 to verify the data 845 successfully transmitted from router A 111 to router C 113, and receives further information from the routers 111, 112, 113 to verify all the protocols and interfaces work properly.

FIG. 1E represents communication packet header structure 810, 820, 830. Packet structural configurations used for different layers of data communication protocols are well known in the art. The current invention empowers a test engineer to create test routines for a wide range of header structures, then, once the tests are created, the routines specifically designed for testing a header can be referenced in future testing in different test beds, such as illustrated in the previous figures.

In a preferred embodiment of this invention, an automated test system (ATS) is used to generate the data packets 810, 820, 830. In an alternate embodiment, the test software 200 contains support routines—external from the main driver routine—that can generate the packets 810, 820, 830. In the preferred embodiment, the ATS can also provide communication support on the hardware interface level, so in the alternate embodiment, communication support library routines are used to provide such functionality.

Figure 2:
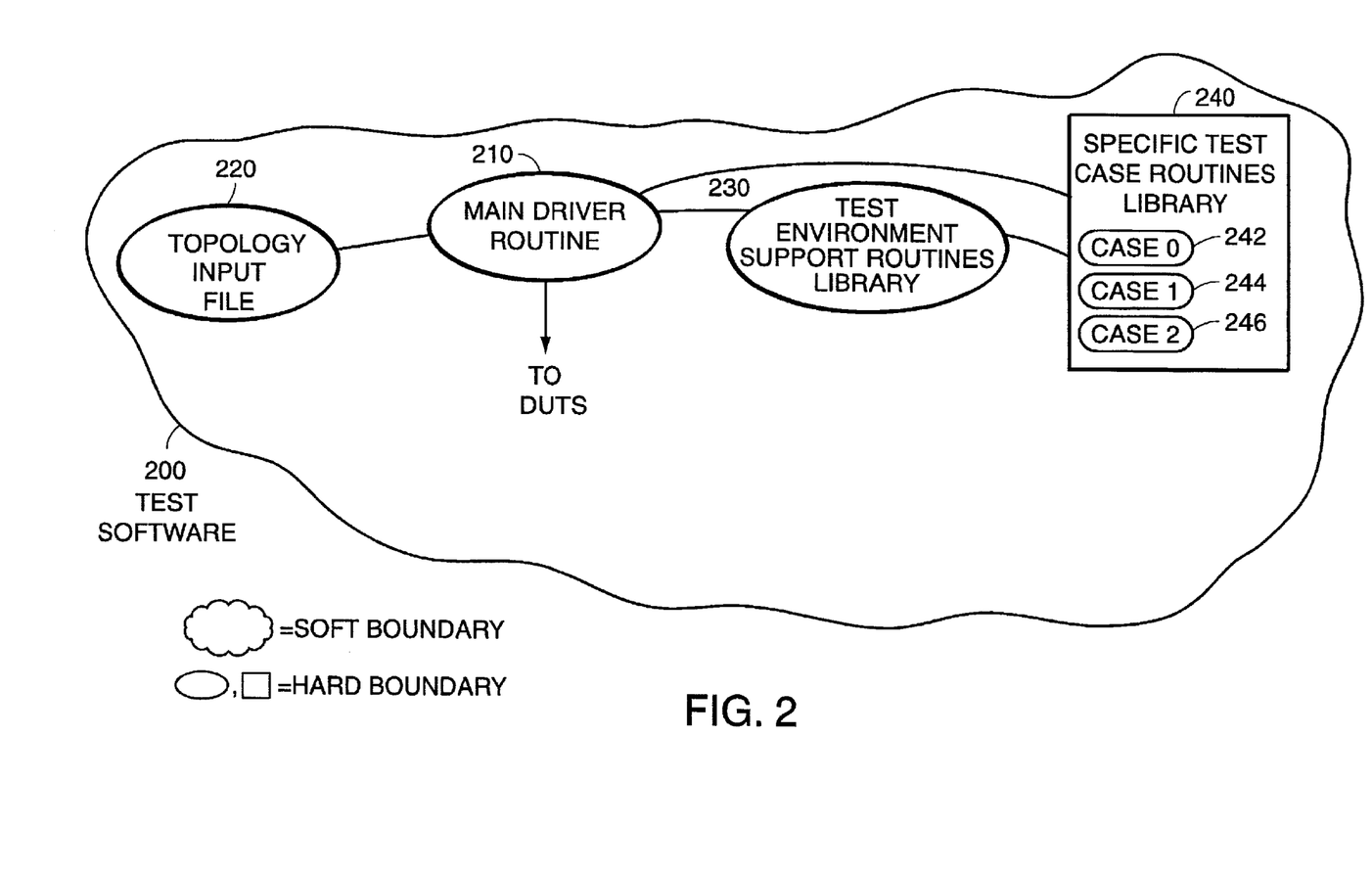
FIG. 2 is a software architecture diagram showing the partitions of and relationships among the major components of the preferred embodiment of this invention.

FIG. 2 shows test software 200, which resides on test computer 100. A main driver routine 210 has external files and routines comprising a topology input file 220, test environment support routines library 230, and specific test case routines library 240. There are three specific test cases depicted inside the specific test case routines library 240, case_0 242, case_1 244, case_2 246. A combination of routines in the external files and libraries is used to create a computer test environment.

The hardware configurations tested by the computer test environment are set-up by the topology input file 220 and tested via the routines inside the specific test case routines library 240. Data collection and other test parameters are managed by test environment support routines library routines 230. In the preferred embodiment, the entire computer test environment will be governed by the main driver routine 210.

In the preferred embodiment, there are three files or directories of subprograms/subroutines having one or two way communication with the main driver routine 210. The direction of communication is not limited, thereby supporting the general testing philosophy of this invention.

In the preferred embodiment, the main driver routine 210 is written in TCL code, sometimes referred to as "tickle". TCL code is interpreted software, as opposed to compiled code, such as "C" and Pascal. The main driver routine 210 needs instructions for what, where, and how to locate external files and routines. These instructions come from outside the main driver routine 210. Future additions and modifications are made to the non-main driver routines 220, 230, 240. The intent is to reduce documentation, provide a constant framework over time, and allow global changes to occur by making changes to, for instance, the test environment support routines library 230.

Figure 3:
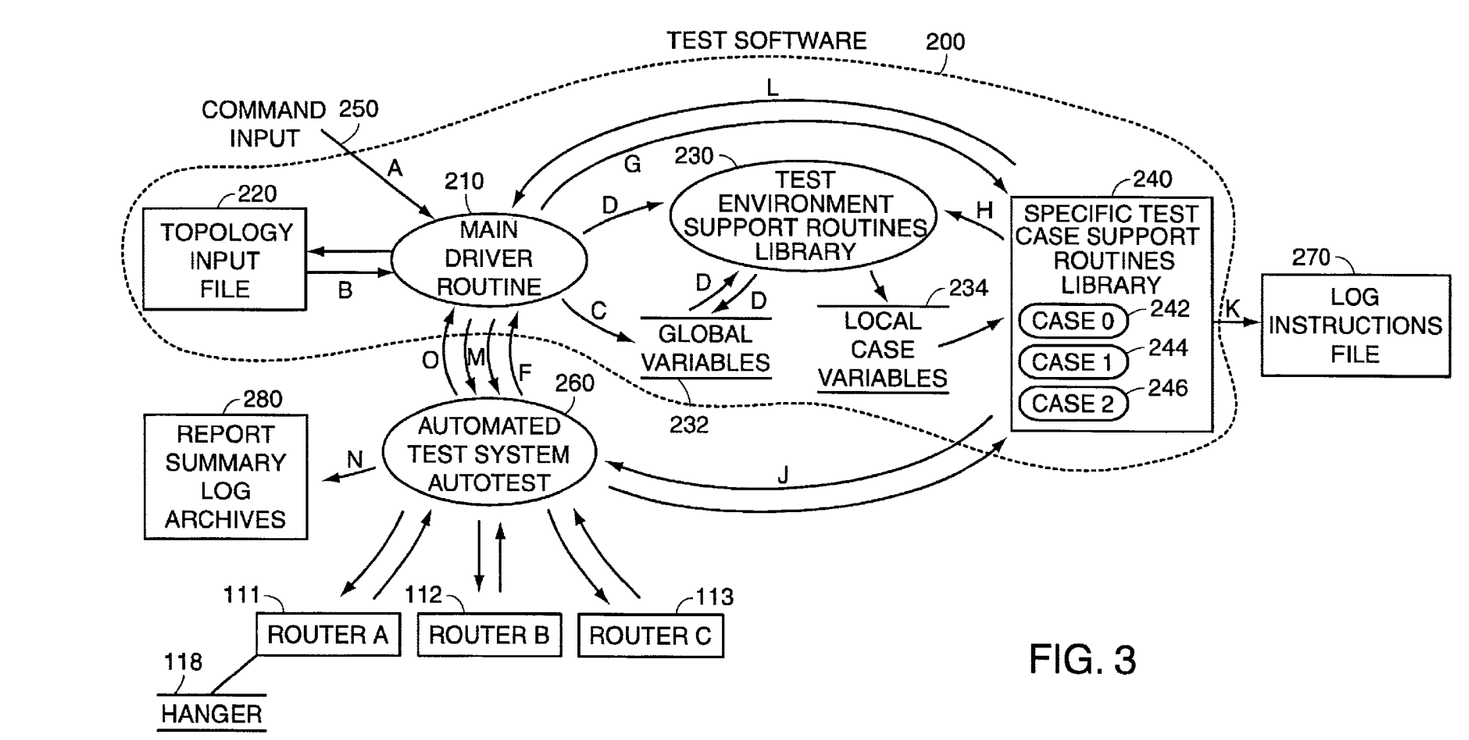
FIG. 3 is a flow diagram of the preferred embodiment when coupled to an automated test system (ATS).

FIG. 3 shows the preferred embodiment of the invention in the context of external inputs and outputs, as well as within the entire test computer environment. The test software 200 encompasses a topology input file 220, a main driver routine 210, a test environment support routines library 230, and specific test case support routines library 240. Also shown in FIG. 3 are arrows indicating communication direction and test flow.

In the preferred embodiment, the main driver routine 210 is initiated by either keyboard commands or automated test system commands in the ATS environment. For example, an ATS environment 260 could have a test suite mode, where multiple topologies and specific tests occur in succession, continuing until the entire range of topologies and desired tests are executed and data are stored.

An example of a command input 250 is:

main$_{13}$ driver<id><net_start><net_start><net_mask><input file>, where:

id is the name to be applied to the report in step 280 for this test. Net_start is a first octet of the network address to be used during this test, where this value is incremented before configuring the next link in the network. Net_mask is the subnet mask to be used on all links. Finally, <input file> is the name of the input file that consists of set commands to define the test cases, router and interface topologies, and configuration options to be executed. This command input 250 provides a starting means for teaching the main driver routine 210 how to build the computer test environment and for setting up the external test environment, including the routing protocols, switching modes, encapsulation modes, and hardware interfaces on the data communication devices.

After receiving the command input 250, the main driver routine 210 reads a topology input file 220. The topology input file 220 describes all topology variables required to configure the unit(s) under test, routers 210. The topology input file 220 is a means to set TCL variables for use by the main driver routine 210. The following is a list of some of the variables available:

TSRs: an optional list identifying those devices that are to be configured as tag switching routers. If undefined, a script will not configure any router as a tag switching router. Undefined means that TSR will not be listed in the topology input file 220.

routers: a mandatory list identifying those devices to be connected sequentially. This list must have an accompanying list of <interfaces>. If undefined, the main driver routine 210 will call an auto test error procedure.

interfaces: a mandatory list of interfaces to be used to connect <routers>110. If undefined, the script will call an auto test error procedure.

alt_routers: an optional array of lists containing routers to be connected to make alternate links within the network. Each list must have an accompanying list of <alt_interfaces>. If undefined, the script will take no action.

alt_interfaces: an optional array of lists containing interfaces to be used to connect the routers in array <alt_routers>. If defined, the script will check for existence of <alt_routers>.

hangers: an optional array of {<routers><interface>} pairs which will be configured as one end of a link. If undefined, the script will take no action.

test_list: a mandatory list of test cases (test_case_name) to be executed. If undefined, the script will call an auto test error procedure. Note: the automated tests array is defined in a support routine as cases (<test_case_name>) <case_proc_name>.

proto_list: an option list of protocols to be applied to each test case in <test_list>. [ospf &/|| eigrp &/|| rip]. If undefined, the script will set <proto_list>to ospf (open shortest path first).

An example of a topology input file is as follows:
set TSRs "rta rtb rtc rtd"
set routers "rta rtb rtc"
set interfaces "e0/1 e0/1 e0/2 e0/2"
set alt_routers (0)"rta rtc"
set alt_interfaces (0) "h1/O h1/O"
set alt_routers (1) "rte rtd rtb"
set alt_interfaces (1) "h1/0 h1/0 h2/0 h2/0"
set hangers (0) "rta e0/3"
set hangers (1) "rte e0/3"
set test_list "1 5 24 56"
set unconfig_topology 0
This example usage can be done by:
main_driver example 180 255.255.0.0 test.input
where this command will result in:
- test cases 1, 5, 24, and 56 being executed using only the OSPF routing protocol (protocol_list undefined).
- The following network (shown in FIG. 8A) being configured at testing.
- Tag switching will be enabled on all interfaces of routers {rta, rtb, rtc, rtd} (no interfaces of router E).
- The unconnected links on rta and rte are assumed to be plugged into some device for which the one end is configured (e.g., an Ethernet repeater to make the Enet interface come up).
- All routers will have a loopback 0 interface created and each will have a unique network address.
- ATM interfaces are configured as "IP unnumbered" and are assigned the loopback 0 as the numbered interface.
- The test topology will always be configured (config_ttopology was undefined), and upon exit after the execution of the last test case (test case 56), the topology will not be unconfigured (unconfig_topology 0).

Still referring to FIG. 3, after the main driver routine 210 has received the topology input file 220, the main driver routine 210 continues to build the computer test environment by defining global variables 232. Then, the test environment support routines library 230 is "sourced" (i.e., loaded from storage into active computer memory) to provide the necessary generic test support to accommodate testing. Local case support variables 234 are then defined. Specific test case support routines library 240 is then accessed and specific test cases, for example, case_0 242, case_1 244, case_2 246 are loaded. Additional test environment support routines library 230 files are then sourced again to support any of the specific test cases 242, 244, 246. In the preferred embodiment, the automated test system 260 is accessed to provide support between the test computer 100 and routers 110.

The main driver routine 210 uses the topology input file 220 and some configuration procedures within the test environment support routines library 220 procedure to configure the network specified in the topology input file 220. In the preferred embodiment, an ATS test suite line argument specifies the topology input file 220 and specific test cases 242, 244, 246 to run. There are several test bed global environment variables initialized for use by library routines 230. They are:
- _t1_net_array: an array, subscripted by router 110 name, containing a list of all the networks used by the router 110 used in the index.
- _t1_rtr_int_array: an array subscripted by router 110 name, containing a list of all the data communication interfaces 160 used by the router 110 in the index. Note: these ints are the same order as in their network assignment (i.e., _t1_net_array (i) is assigned to _t1_rtr_int_array (i)).
- _t1_rtr_array: an array of router 110 names. This is indexed by numbers which correspond to the order in which routers 110 are encountered in the topology input file 220. There are no duplicate entries.
- _t1_int_array: an array of data communication interfaces 160 used to create the topology. This is indexed by numbers and is used by some low level procedures in creating the overall topology. In the preferred embodiment, the _t1_net_array and the _t1_rtr_int_array should be used when making configuration changes such as "shut" and "no shut" on interfaces. Also the net_start variable's value will be changed to match a next available network for use by interfaces other than loopback interfaces.

The following example illustrates the values of the global variables after completing the "build global environment variables" portion of the main driver routine 210. For the "input file TCL var example" discussed above, and shown in FIG. 8A, _t1_net_array, _t1_rtr_int_array, and net_start would have the following values:
_t1_net_array (rta) "180 182 185"
_t1_net_array (rtb) "180 181 184"
_t1_net_array (rtc) "181 182"
_t1_net_array (rtd) "183 184"
_t1_net_array (rte) "183 186"
_t1_rtr_int_array (rta) "e0/1 h1/0 e0/3"
_t1_rtr_int_array (rtb) "e0/1 e0/2 h2/0"
_t1_rtr_int_array (rtc) "e0/2 h1/0"
_t1_rtr_int_array (rtd) "h1/0 h2/0"
_t1_rtr_int_array (rte) "h1/0 e0/3"
next_start 187
loop_net 15

The main driver routine 210 sets up the 2-dimensional topo_config array for the configuration and unconfiguration of each router in the test bed topology.
Entries in the array take the form:
- topo_config (config, device_name) is the config string that should be applied to the router 110 device_name.
- topo_config (unconfig, device_name) is the unconfig string that should be applied to the router 10 device_name. Any test case specific configuration should occur within the test case specific code contained in the specific test case support routines library 240.

After each routing_protocol of protocol_list has been applied to each switching mode in switch_mode_list (which, in turn, has been applied to the test cases in test_list), the main driver routine 210 will unconfigure the routers 110 in the test bed, provided that unconfig_topology is set to one.

Continuing to refer to FIG. 3, information returned from the routers 110 is stored in a report summary log archives file 280, and this information is compared to the log instructions file 270. In the preferred embodiment, the report summary log archives file 280 and the log instructions file 270 are text files. Also, in the preferred embodiment shown, the main driver routine 210 and the ATS 260 has control passed back and forth until the tests are complete for a given command input 250; then, the program either ceases, if a command line input initiated the testing, or receives the next command input 250, if execution started from a test suite contained in the ATS environment.

Finally, it should be noted which elements are topology independent. The main driver routine 210 is independent of its external environment, in so much as it learns the computer environment and the hardware environment via external routines 220, 230, 240. Environment support routines library 230 is also independent from the external hardware, unless it has routines that support external communications (i.e., performs ATS functions). The log instructions file 270 contains information sent to it from the specific test case support routines library 240, but it learns that information and does not require knowledge of topology; the same can be said for the report summary log archives 280. The topology input file 220 and the specific test case support routines library 240 are the most specific blocks in the diagram, meaning that the test engineer must know a great deal of information about the data communication devices, the desired network topologies, the routing protocols, the switching modes, the encapsulation modes, and the hardware interfaces being tested.

An important benefit of this invention shown in the embodiment of FIG. 3 is that the test engineer need only provide a topology input file 220 and specific test cases, such as case_0 242, case_1 244, and case_2 246. In addition, after the development, debug, and integration of topology input files 220 and specific test cases 240, they can be reused later in future testing, especially to ensure backward compatibility by future generations of data communication devices.

Figure 4:
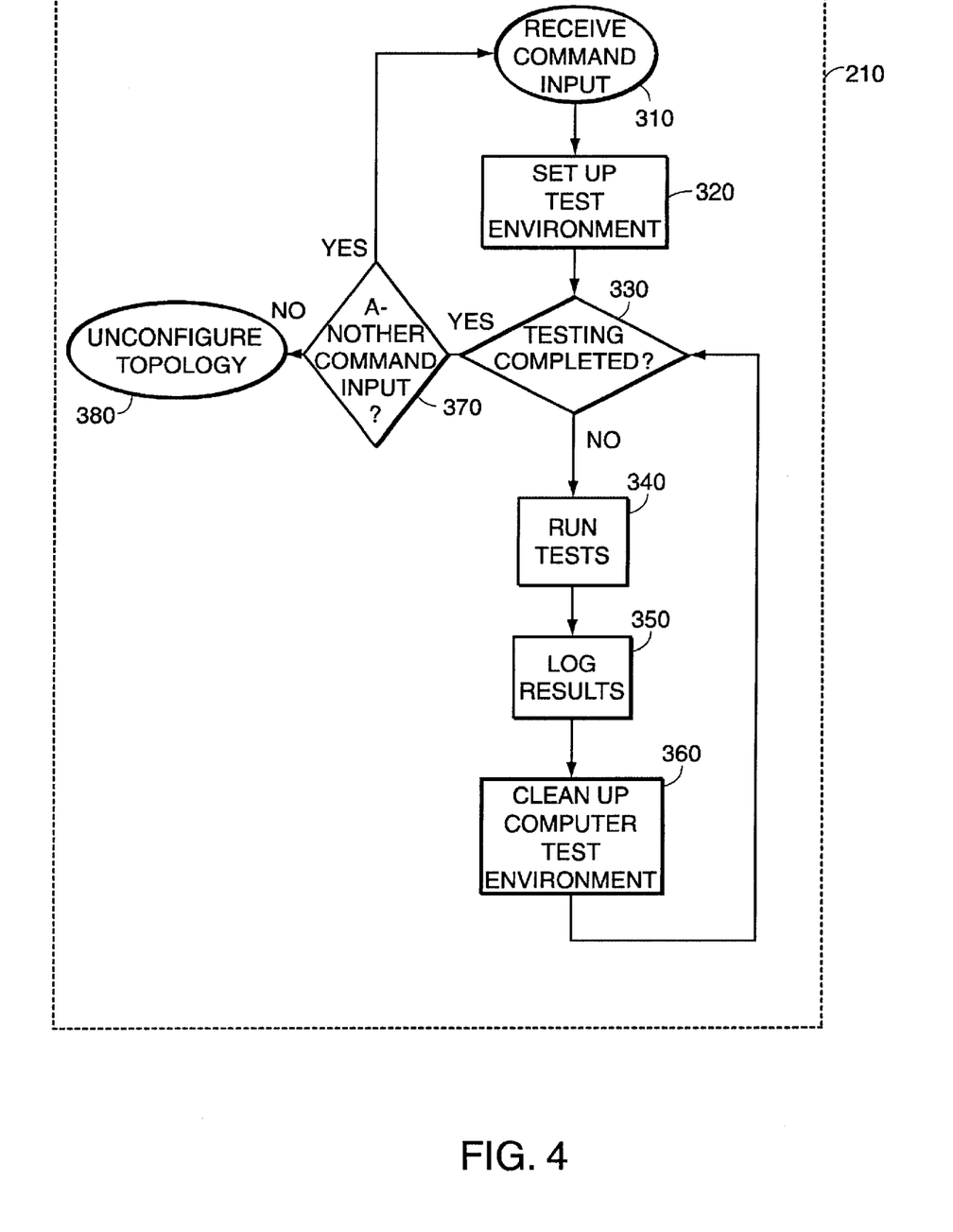
FIG. 4 is a flow diagram of the main driver routine.

Referring to FIG. 4, the main driver routine 210 receives a command input in step 310, sets up a computer test environment in step 320, then checks to see if testing is complete in step 330. If testing is not complete in step 330, specific tests are run in step 340 and the results are logged in step 350. The computer test environment is cleaned up in step 360, then another check to determine if the testing is complete in step 330. If the testing is complete in step 330, the main driver routine 210 checks to see if there is another command input in step 370. If there is another command input in step 370, the main driver routine 210 receives that next command input instep 310. If there is not another command input in step 370, the main driver routine 210 unconfigures the topology in step 380, provided the unconfig_topology variable in the topology input file 220 has been set to one. In a preferred embodiment, the network topology is learned before testing begins, changed during testing, and reconfigured to the initial topology before testing terminates.

The high level block diagram of the main driver routine 210, shown in FIG. 4, has two blocks—set up test environment in step 320 and run tests in step 340—which have been partitioned outside of the main driver routine 210, making this invention scalable, modifiable, and general.

Figure 5:
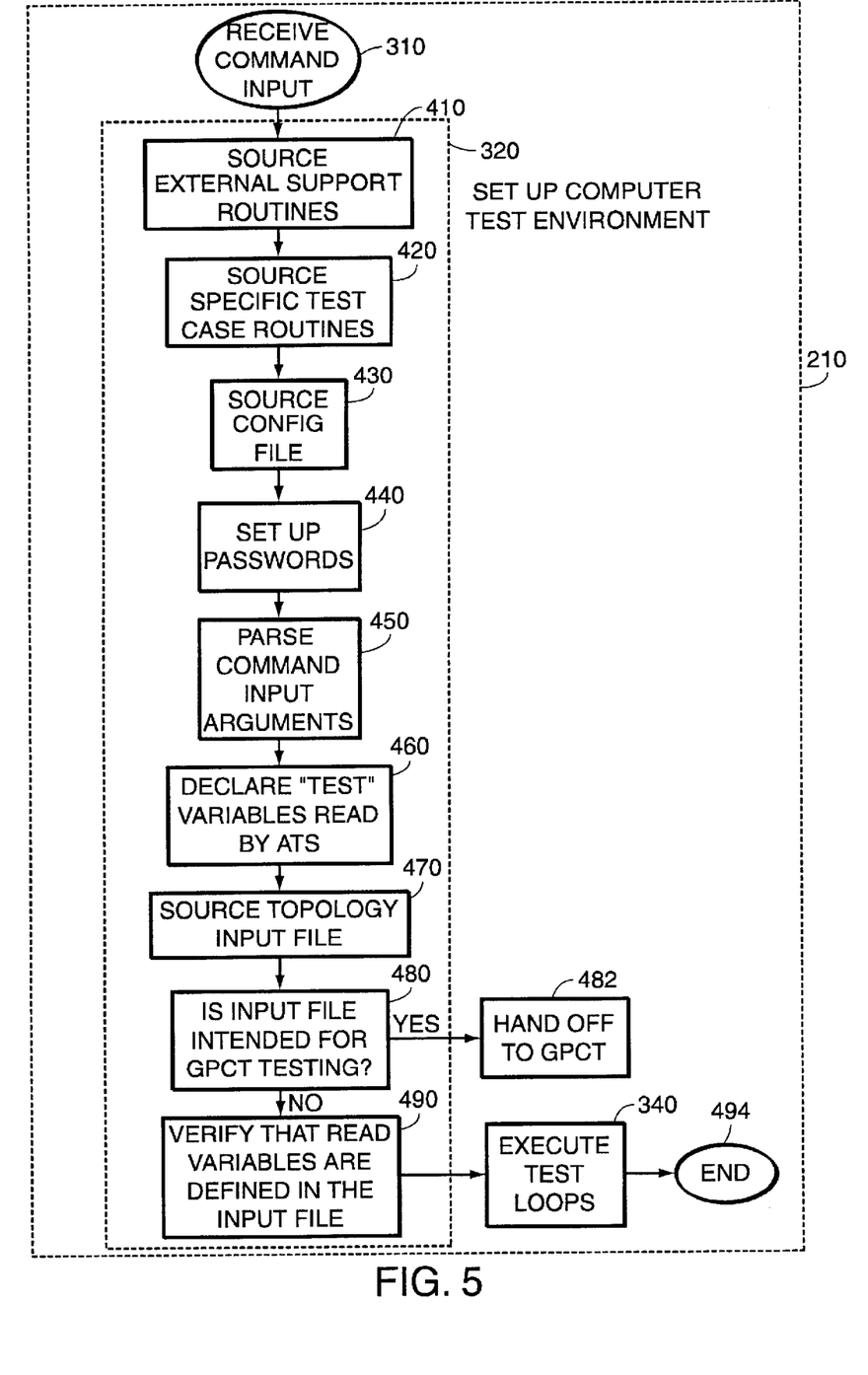
FIG. 5 is a block diagram of the computer environment set up portion of the main driver routine.

FIG. 5 is a flow diagram overview of the main driver routine 210 with expanded test environment set up in step 320. The main driver routine 210 receives command input in step 310, which launches the main driver routine 210. External support routines are sourced in step 410. Again, because TCL is an interpreted language, the software is loaded and interpreted before running, allowing for change-and-run integration techniques.

Specific test case routines are sourced in step 420, then a configuration file is sourced in step 430. Optional passwords are set up in step 440. Command input arguments are parsed in step 450. In the preferred embodiment using an ATS, "test_" variables are declared in step 460. A topology input file 220 is next sourced in step 470 into memory. A check as to whether the input file is intended for GPCT testing in step 480 is performed. GPCT is an acronym for Generic Protocol Conformance Test Tool, which is an extension of the generic test execution method of the current invention. This is an example of how the current invention is extended to support other types of applications. A check to verify the required variables are defined in the input file in step 490 is next done before executing test loops in step 340. After the test loops are done, which includes unconfiguring the topology in step 380, the main driver routine 210 ends in step 494. In the preferred embodiment, the main driver routine 210 checks whether there is another command input in step 370, then unconfigures the test-time network topology in step 380, putting the network back into the pre-testing topology.

According to the teachings of this invention, protocol specific information is loaded during the source specific test case routines in step 420 and source topology input file in step 470 portions of the main driver routine 210. All the other blocks in FIG. 5 are non-routing protocol, switching mode, encapsulation mode, and hardware interface specific, notwithstanding the variables that contain network device configuration information.

Figures 6, 6A:
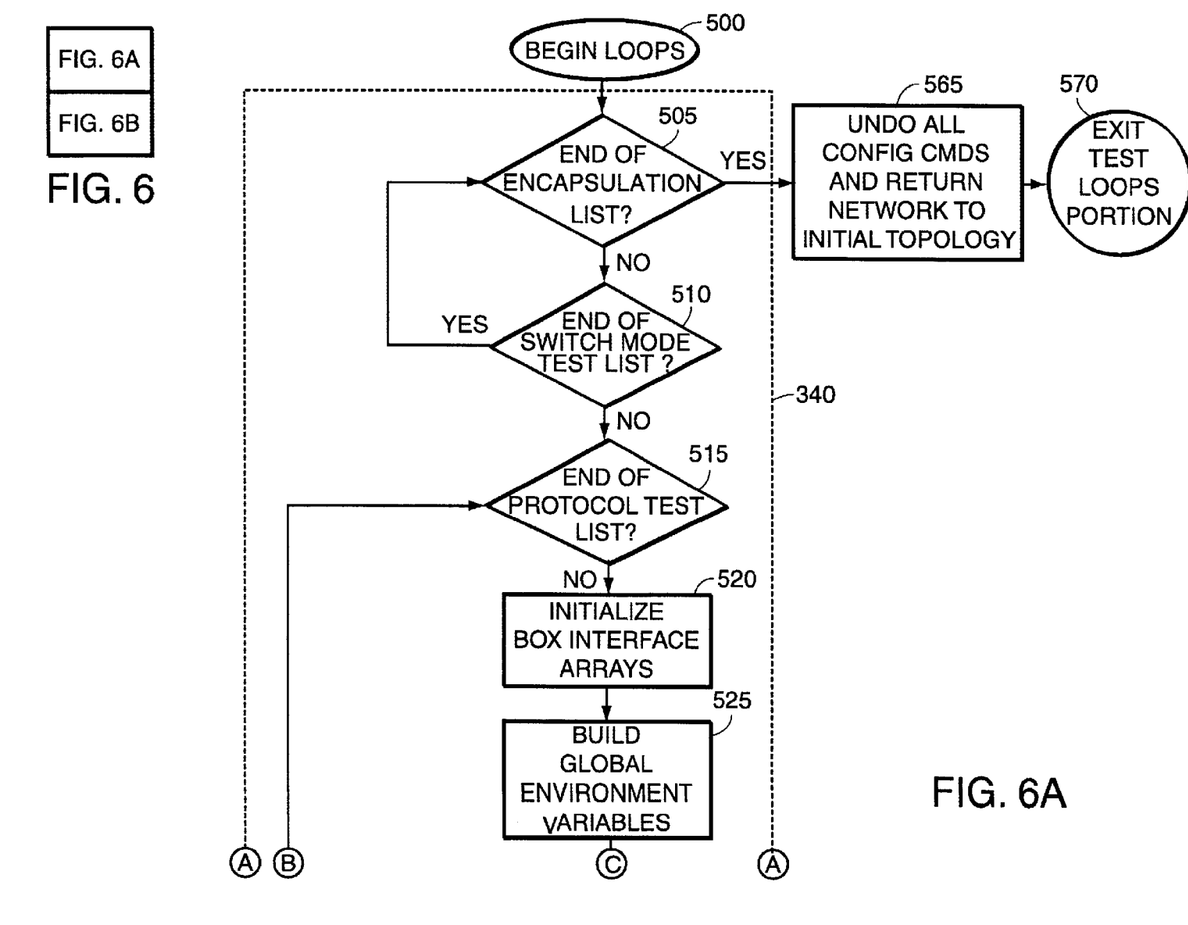
FIG. 6 is a flow diagram of the test loops portion of the main driver routine.
Figure 6B:
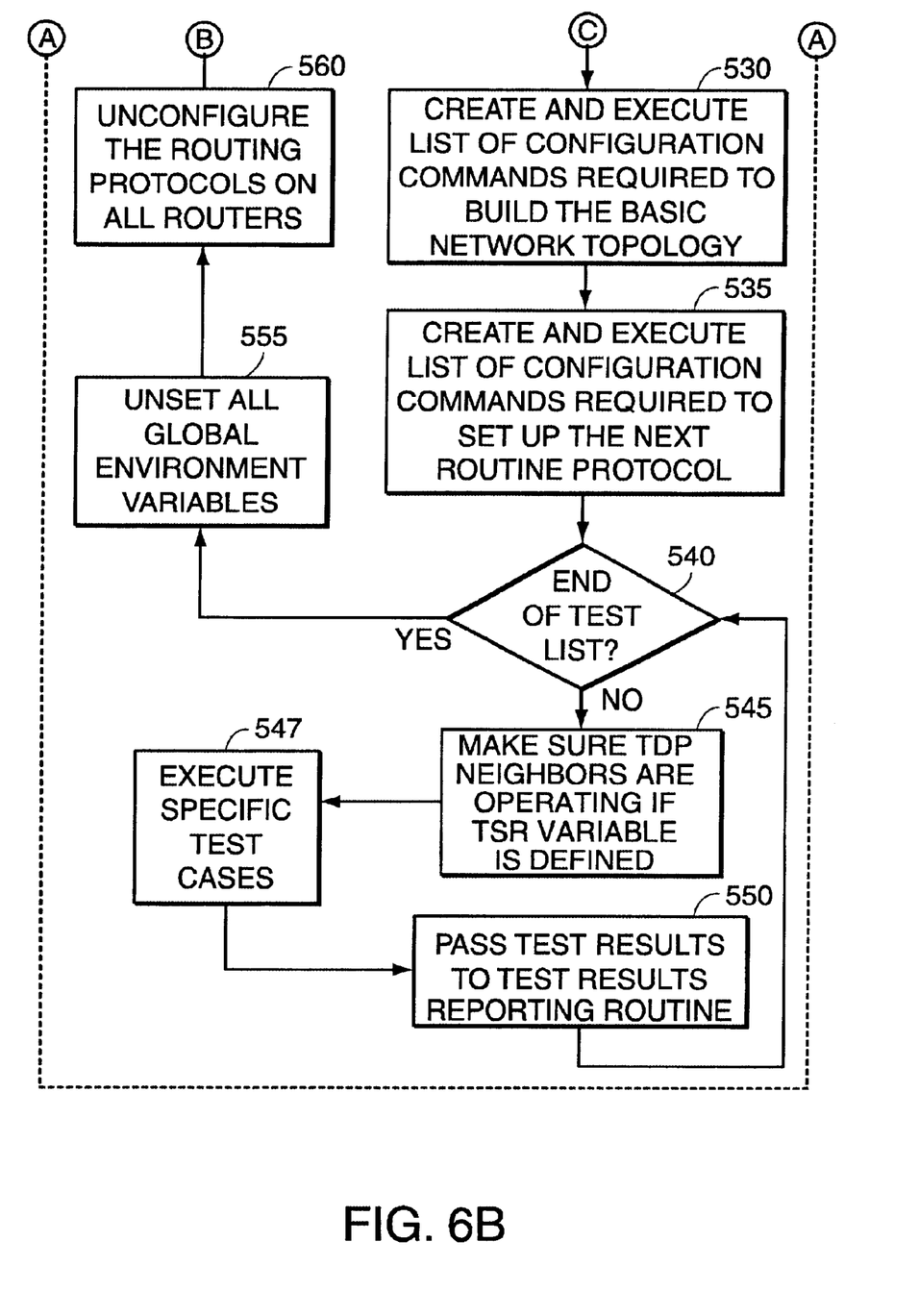

FIG. 6 shows the main driver routine 210 test loops in Step 340 in more detail. After beginning the loops Step 500 portion of the main driver routine 210, an end of encapsulation list query in Step 505 is made. If the end of encapsulation list query in Step 505 is "yes", then an undo of all configuration commands and return network to initial topology in Step 565 is performed. Then, the main driver routine 210 exits the test loops Step 340 portion in Step 570.

If the end of encapsulation list query in Step 505 is "no", then an end of switch mode test list query in Step 510 is made. If the end of switch mode test list query in Step 510 is "yes", then the execute test loops in Step 340 returns to the end of encapsulation list query of Step 505. If the end of switch mode test list query in Step 510 is "no", then execute test loops in Step 340 proceeds to the end of the protocol test list query in Step 515.

If the end of protocol test list query in Step 515 is "yes", then execute test loops in Step 340 returns to the end of switch mode test list query of Step 510. If the end of protocol test list query of Step 515 is "no", then execute test loops in Step 340 proceeds into substantive portions of testing for the current invention.

Initializing each "box" and "interface" arrays in Step 520 is the first task to complete. Initializing these arrays ensures that testing begins in a known initial state. In the preferred embodiment of this invention, the initialization information is contained in a file external from the main driver routine 210.

Building global environment variables 232 in Step 525 is performed next. The global environment variables 232 built by Step 525 relate to routing protocols, switching modes, encapsulation modes, and hardware interface variables in which the network topology under tests being operated on by the present invention will be used. In an embodiment of the present invention, unused global environment variables 232 are filled with known states.

Once global environment variables 232 have been built in Step 525, the main driver routine 210 in the execute test loops Step 340 portion creates and executes a list of configuration commands required to build the basic network topology in Step 530. This list of configuration commands is specific to the units under tests, 111, 112, 113, for example. In the preferred embodiment of the present invention, the information for how to create and execute the list of configuration commands required to build the basic network topology in Step 530 is contained in a file external from the main driver routine 210.

After Step 530, the execute test loops 340 portion of the main driver routine 210 creates and executes a list of configuration commands required to set up the next routing protocol in Step 535. This list of configuration commands is also external from the main driver routine 210 in the preferred embodiment of the present invention. After Step 535, all configuration of the network topology is set so that individual tests can be performed by Steps 540, 545, 550.

Upon entering the individual tests portion of the main driver routine 210, an end of test list query in Step 540 is made. If the answer is "yes" to Step 540, then an unset all global environment variables in Step 555 is performed. Then, an unconfigure the routing protocols on all routers in Step 560 is performed. The execute test loops 340 portion then returns to the end of protocol test list query in Step 515 again and branching occurs as described above.

If the end of test list query in Step 540 is "no", then the execute test loops Step 340 portion makes sure that TDP (tag distribution protocol) neighbors are operating in Step 545 if variable TSRs is defined. Then, the specific test cases are executed in Step 547 and test results are passed to a test result reporting routine in Step 550. In an embodiment of the present invention, the test results reporting routine(s) 280 are outside the main driver routine 210. These test results reporting routines 280 may be part of the ATS 260 or found in the test environment support routines library 230. After Step 550, the end of test list query in Step 540 is performed, and branching occurs as described above.

In effect, the execute test loops 340 portion of the main driver routine 210 is a plurality of embedded loops that have been designed to solve the problem at hand. The descriptions above are just one possible embodiment of the present invention. The importance is that topology specific information is contained in external files and routines apart from the main driver routine 210, thereby keeping the main driver routine 210 topology independent and general in present and future capability.

Figure 7:
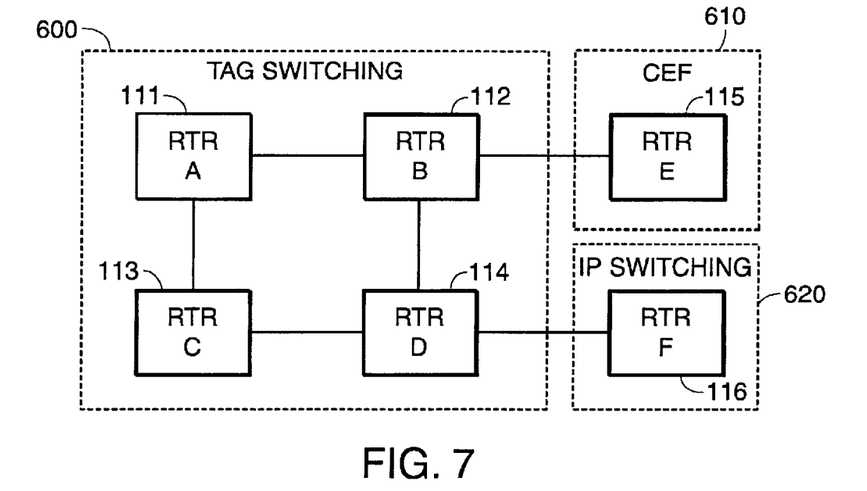
FIG. 7 is a schematic diagram that shows an example of the switching modes used in a network.

FIG. 7 shows switching protocols on different routers configured in a possible network. Router A 111, router B 112, router C 113, and router D 114 are configured in the topology input file 220 to use tag switching.

Router E 612 is running CEF switching (Cisco Express forwarding) protocols. Router F 622 has been defined in the topology input file 220 to operate using an IP switching mode. The topology input file 220 has the information defining which tag switching routers 600 communicate with one another; it also defines that router B 112 and router E 612 communication with one another, even though they use different switching modes. Router D 114 and router F 622 must also communicate with different encapsulation modes, as discussed earlier, to transmit data packets 845 between one another. One can see that an alternate route could be formed from router B 112 to router D 114 by traveling from router B 112 to router A 111 to router C 113 to router D 114. This alternate route is defined in the topology input file 220. In the preferred embodiment, nothing specific to the FIG. 7 interconnections is contained in the main driver routine 210.

Figure 8A:
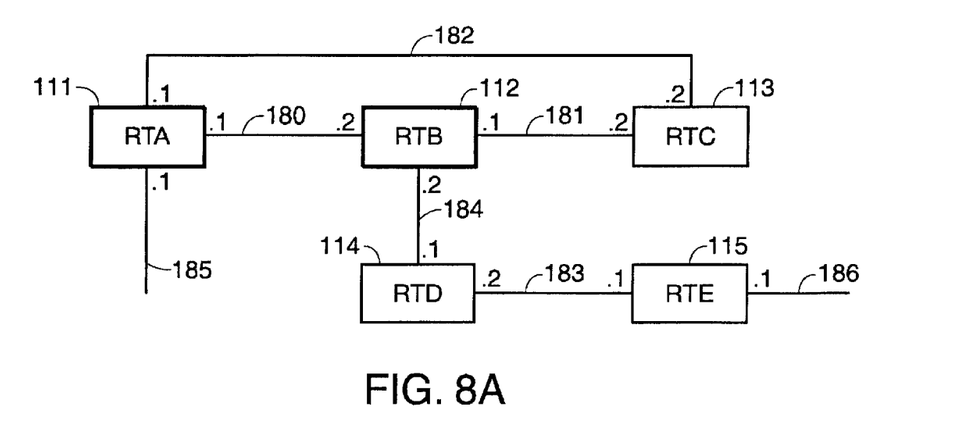
FIGS. 8A and 8B are block diagrams two topologies of a network of routers as configured two different topology input files.
Figure 8B:
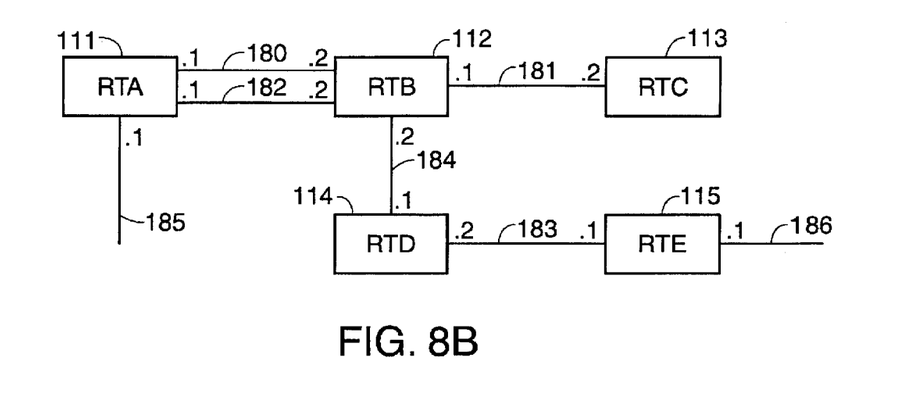

Referring to FIG. 8A and FIG. 8B, both of these network topologies begin with the same structure in terms of routers, switching mode capabilities, and interfaces. The main difference between the two is link 182, which in FIG. 8A connects router A 111 to router C 113, as opposed to FIG. 8B, where link 182 connects between router A 111 and router B 112. The network topologies for FIGS. 8A and 8B are defined in different topology input files 220.

| FIG. 8A Topology Input File | FIG. 8B Topology Input File |
| --- | --- |
| set TSRs "rta rtb rtc rtd" | set TSRs "rta rtb rtc rtd rte" |
| set routers "rta rtb rtc" | set routers "rta rtb rtc" |
| set interfaces "e0/1 e0/1 e0/2 e0/2" | set interfaces "e1/0 e1/0 e0/2 e0/2" |
| set alt_routers (0) "rta rtc" | set alt_routers (0) "rta rtb" |
| set alt_interfaces (0) "h1/0 h1/0" | set alt_interfaces (0) "h1/0 h1/0" |
| set alt_routers (1) "rte rtd rtb" | set alt_routers (1) "rte rtd rtb" |
| set alt_interfaces (1) | set alt_interfaces (1) |
| "h1/0 h1/0. . . | "h1/0 h1/0 . . . |
| . . . h2/0 h2/0" | . . . h2/0 h2/0" |
| set hangers (0) "rta e0/3" | set hangers (0) "rta e0/3" |
| set hangers (1) "rte e0/3" | set hangers (1) "rte e0/3" |
| set test_list "1 5 24 56" | set test_list "X" |
| set unconfig_topology 0 | set unconfig_topology 0 |

In a preferred embodiment, the specific test case library 240 is a library of test case procedures for every test case that can be exercised by the main driver routine 210. Each test case 242, 244, 246 has the same interface to allow a generic loop to be used to execute the test case numbers specified in the variable test_list of the topology input file 220. The list test_list contains the names of the procedures to be invoked for the command input 250 as given by the <input file> variable.

The test cases 242, 244, 246 contained in the specific test case library 240 are designed to take advantage of the presence of multiple physical connections between routers whenever possible. Therefore, it is possible to test several interface types with one test invocation by creating a topology which contains parallel links between routers and then listing the primary interface in the <interfaces> variables and the others in separate entries in the <alt_routers> array of lists. For example, FIG. 8B and its associated topology input file 220 would essentially result in test case X being executed twice, once for the Ethernet link and once for the HSSI link.

In a preferred embodiment, interfaces that are elements of the list <interfaces> will be "no shut". Also, the loopback 0 interfaces will be "no shut" as well. All other interfaces will be shut down when the script begins. The test case is responsible for executing the "no shut" command on required elements of the list <alt_interfaces>.

Figure 9:
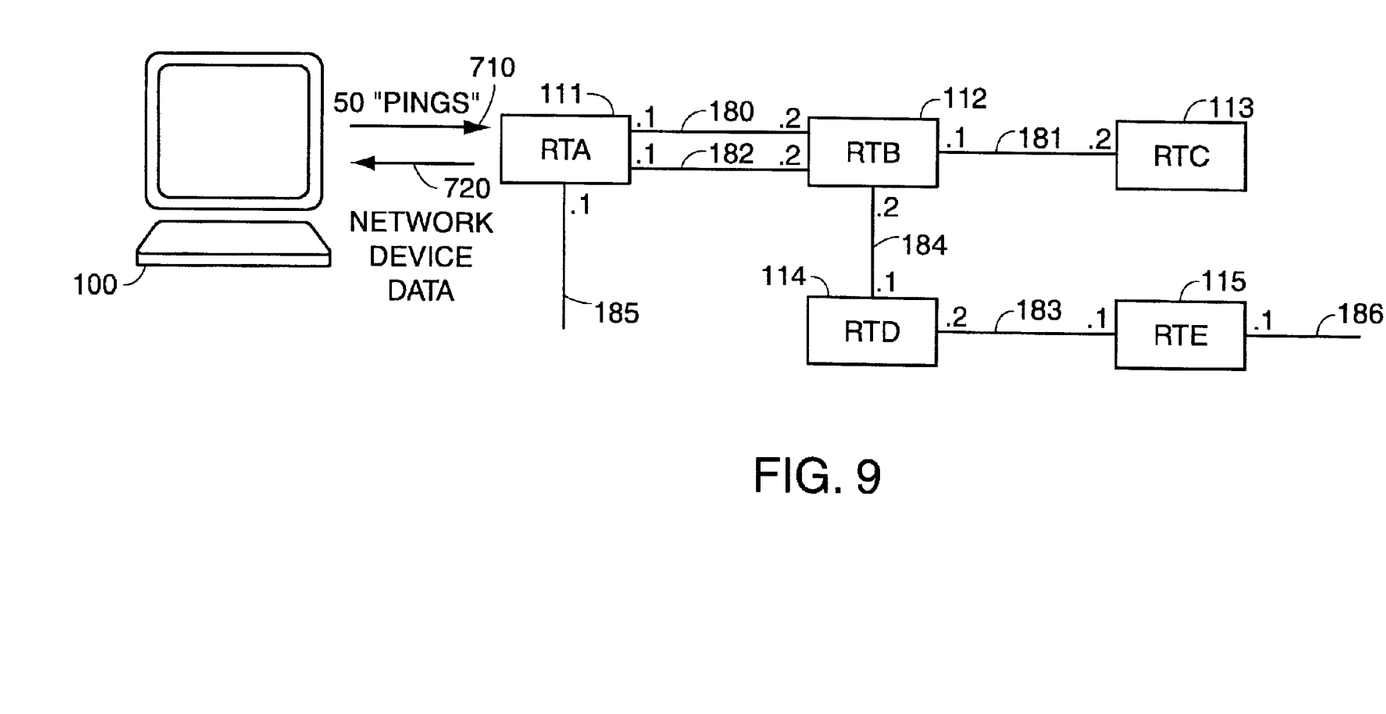
FIG. 9 shows a network being "ping" tested.

FIG. 9 shows an example where 50 "pings" 710 are issued to router A 111. Network device data 720 retrieved and stored by the test computer 100 usually consists of the number of pings received by some or all of the network devices 110, the time intervals between received pings 710, and other information useful for router 111, 112, 113, 114, 115 protocol conformance testing. In an embodiment of this invention, the computer 100 connects to a data communication port 162, 164, 166, 168 through a TCP/IP link to issue the 50 "pings" 710. In an alternate configuration, router A 111 is instructed to issue 50 "pings" by a command input from the test computer 100 through the command/control console port 150. The knowledge of the two configurations for issuing the pings is programmed into the topology input file 210 and specific test case routines 242, 244, 246 by the test engineer. The main driver routine 210 has no special code to account for the different ping 710 command configurations.

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. A test system for network communication devices, comprising topology input file describing connections between the network communication devices; and test environment support routines library containing device-independent test environment information for data management;

test case specific routines library containing device-specific tests and device-specific configuration control information for the network communication devices; and a main driver routine, executing on a test control computer connected to download configuration and control information into the network communication devices, the main driver routine receiving a test command and in response accessing the topology input file to build test vector command buffers for each of the network communication devices by reference to the test environment support routines, to establish configuration for testing by the test case specific routines.

2. The test system according to claim 1 wherein the test control computer communicates with the network communication devices using an automated test system.

3. The test system according to claim 2 wherein the main driver routine has interface means for receiving test commands in series for multiple network topology testing in the automated test system environment.

4. The test system according to claim 1 wherein the topology input file further describes transmission protocols of the connections between the network communication devices.

5. The test system according to claim 1 further comprising at least one external data communication device capable of issuing data packets to test the network communication devices under varying data traffic conditions.

6. The test system according to claim 1 wherein the main driver routine stores pre-test network topology settings and restores said pre-test network topology settings prior to test termination.

7. The test system according to claim 1 wherein the test control computer physically interfaces with the network communication devices via console ports on the network communication devices.

8. The test system according to claim 1 wherein the test environment support routines library contains test results logging and reporting routines.

9. The test system according to claim 8 wherein the test environment support routines library contains test command logging routines to store network device topology commands to storage for later retrieval.

10. The test system according claim 8 wherein the test data logged is written into a text file.

11. The test system according to claim 1 wherein the main driver routine is written in an interpreted language.

12. A method of testing a network of data communication devices from a test control computer connected to configure the data communication devices, the method comprising:

receiving at least one input command by the test control computer;

sourcing external routines in response to said input command;

building memory buffers comprising test vectors defined in said external routines by reference to a topology input file and environment support routine libraries, wherein said test vectors comprise network device commands that dictate interconnections between the data communication devices and communication protocol modes of the interconnections;

issuing network device commands to the data communication devices, said network device commands comprising said test vectors stored in the memory buffers; and receiving test information from the data communication devices, wherein the test information comprises result data logged by and received from the network devices.

13. The method of claim 12 wherein issuing network device commands includes data traffic creation commands.

14. The method of claim 13 wherein issuing network device commands includes issuing commands to generate "pings" among the network communication devices.

15. The method of claim 12 further comprising the step of logging the test information received from the data communications devices to a file.

16. The method of claim 15 further comprising the step of logging the issued network device commands to a file.

17. The method of claim 12 wherein issuing network device commands includes the step of issuing commands that test alternate topology data paths.

18. The method of claim 12 wherein before each network topology configuration the memory buffers comprising test vectors are initialized to a known state and rebuilt with a next network topology configuration.

19. The method of claim 12 wherein issuing network device commands comprises additional commands for tag switching network devices.

20. The method of claim 12 further comprising a step to determine that testing a network of data communication devices has been specified by the input command.

* * * * *